Figure 1:
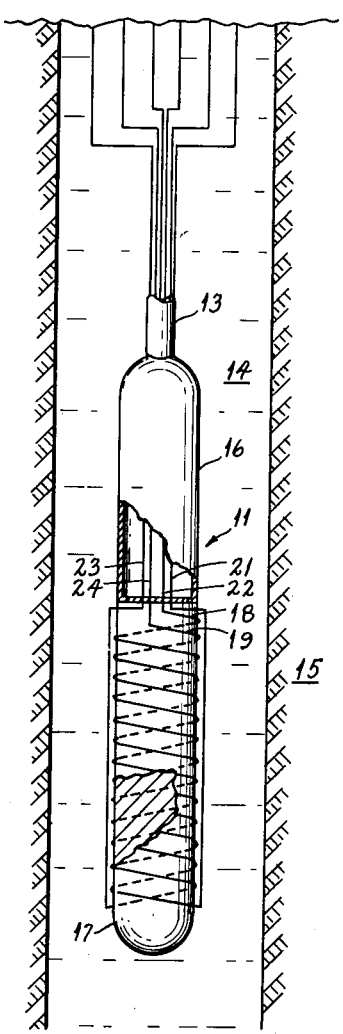

Nov. 29, 1955  HENRI-GEORGES DOLL  2,725,523
MULTIPLE COIL APPARATUS FOR INDUCTION WELL LOGGING
Filed June 6, 1952

INVENTOR.
HENRI-GEORGES DOLL
BY
Campbell, Brumbaugh, Free & Graves
HIS ATTORNEYS

United States Patent Office 2,725,523
Patented Nov. 29, 1955

2,725,523

MULTIPLE COIL APPARATUS FOR INDUCTION WELL LOGGING

Henri-Georges Doll, Ridgefield, Conn., assignor to Schlumberger Well Surveying Corporation, Houston, Tex., a corporation of Delaware Application June 6, 1952, Serial No. 292,179

10 Claims. (Cl. 324—6)

The present invention relates to induction well logging apparatus and more particularly to multiple coil apparatus of this character having substantially the same sensitivity characteristics as single coil apparatus but without certain inherent deficiencies of the latter.

Various induction well logging systems have been devised in which a single coil, energized by alternating current, is moved through a bore hole in electromagnetically coupled relation to the surrounding media. In such systems, an important parameter to be investigated is the electrical conductivity of the formations surrounding the bore hole, although the magnetic susceptibility of such formations is also sometimes of interest. Either or both of these parameters may be determined by obtaining indications of variations in the impedance of the single coil in the bore hole. While single coil systems of this type are completely lacking in the desirable focussing and other features embodied in the multiple coil systems disclosed in the applicant's prior Patents Nos. 2,582,314 and 2,582,315, they have the advantages of constructional simplicity and relative ruggedness for bore hole operations.

Aside from the relative advantages and disadvantages noted above, single coil induction logging systems of the type used heretofore have a further serious disadvantage in that changes in the impedance of the coil and particularly in the resistive component thereof, may be produced not only by the surrounding media, but also by spurious resistance changes in the coil resulting from mechanical changes or heating of the coil by the exciting current supplied thereto or by the bore hole liquid. It is extremely difficult to determine what proportion of the resistive component of the total impedance change can be attributed to the electrical conductivity of the surrounding media. Because of this, the utility of such systems is relatively limited.

It is an object of the invention, accordingly, to provide an induction well logging system having substantially the same advantages and sensitivity characteristics as a single coil system but which is essentially free from the above-noted spurious resistance changes encountered in the single coil systems employed up to the present.

This is accomplished according to the invention by lowering into the bore hole a transmitter coil and a receiver coil having relatively close inductive coupling therebetween. Preferably, the coefficient of coupling between the two coils is substantially unity so that the mutual inductance between them is substantially equal to the square root of the product of the respective self-inductances. The transmitter coil is energized by alternating current of substantially constant magnitude and the response of the receiver coil is fed to low current drain indicating means so that any variations in the resistances of the transmitter and receiver coils will not have any effect on the mutual impedance between the coils, which is the quantity actually measured. With this construction, the resulting system has the ruggedness, simplicity and substantially the same sensitivity characteristics as a single coil system, but for all practical purposes without the undesired spurious resistance variations encountered in the latter.

Figure 2:
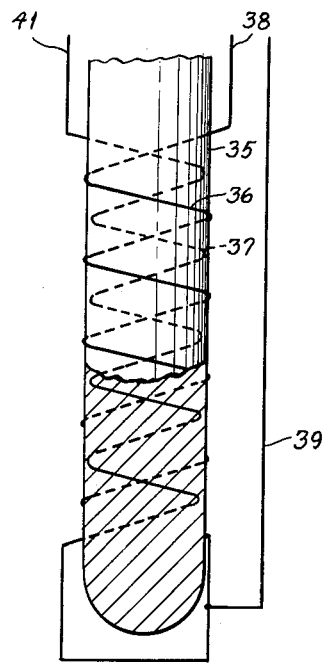
Figure 3:
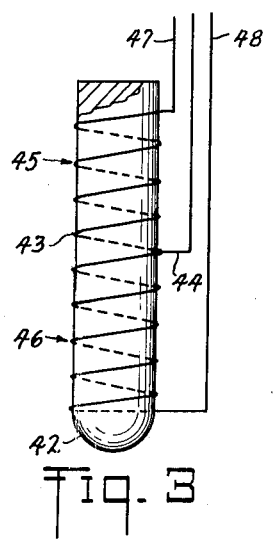

The invention will be more fully understood from the following detailed description thereof and by reference to the accompanying drawings wherein:

Fig. 1 is a schematic drawing of one type of novel multiple coil structure associated with an induction well logging apparatus in a bore hole; and Figs. 2 and 3 are schematic drawings of other types of novel multiple coil structures, which may be substituted in the apparatus of Fig. 1.

The relative spacing of the turns in the illustrated coils is exaggerated and the number of turns is minimized in order to increase the clarity of the drawings.

Referring now to Fig. 1, induction logging apparatus 11 is shown in a bore hole 12 supported by an electrical cable 13. The bore hole 12 contains drilling liquid 14 and traverses earth formations 15, the electrical properties of which it is desired to investigate. The induction logging apparatus 11 comprises a pressure-resistant hollow cylindrical housing 16 to which is attached a core 17 which supports electrical coils 18 and 19. The core 17 may be constructed of either magnetic or nonmagnetic material and may conveniently have a generally cylindrical shape with a diameter small compared to its length to permit movement through the bore hole 12. In the form illustrated in Fig. 1, the coils 18 and 19 are wound helically along substantially the entire length of the core 17 with a coefficient of coupling of substantially unity. Under these conditions, the mutual inductance between the two coils is substantially the same as the self-inductance of either one alone. The coils have the same pitch and the turns of one coil lie between adjacent turns of the other coil. The two coils 18 and 19 are electrically insulated from each other and from the drilling liquid 14. The ends of coils 18 and 19 are connected by conductors 21, 22 and 23, 24, respectively, to the housing 16.

One of the coils 18 and 19 is energized with alternating current of substantially constant magnitude generated within the housing 16 by an oscillator (not shown). The voltage induced in the other of the coils 19 or 18 is applied to low current drain electronic apparatus within the housing 16 which apparatus converts the induced voltage to unidirectional signals, the amplitudes of which vary in accordance with the magnetic susceptibility and the conductivity, respectively, of the media surrounding the induction logging apparatus 11. The electronic apparatus within the housing 16 may, for example, be constructed in accordance with the principles set forth in my copending application Serial No. 750,307, filed May 24, 1947, and entitled "Phase Rejection Networks."

An electrical power source 25 outside the bore hole 12 supplies power through insulated cable conductors 26 and 27 to the apparatus within the housing 16.

Recording galvanometers 28 and 29 may be provided outside the bore hole 12 connected to the measuring equipment within the housing 16 by means of cable conductors 31, 32 and 33, 34, respectively, to indicate the magnetic susceptibility and conductivity, respectively, of the formations 15 being logged. It will be understood that the coils 18 and 19 and/or the galvanometers 28 and 29 may have one common terminal, respectively, thereby eliminating one of the conductors 21, 22, 23 and 24 and/or one of the conductors 31, 32, 33 and 34, respectively.

It will be apparent that the novel multiple coil construction shown in Fig. 1 has all of the advantages of ruggedness and simplicity inherent in a single coil system. Since the coefficient of coupling between the transmitter and receiver coils is substantially unity, the mutual impedance between the two coils is substantially equal to the square root of the product of the self-impedances. Hence, the applicant's novel two-coil system behaves essentially like a single coil system in that its sensitivity characteristics and the magnitude of its response are essentially the same as for a single coil system. However, variations in the resistance of either of the coils will have no effect on the voltage induced in the receiver coil, because the magnitude of the alternating current energizing the transmitter coil is maintained substantially constant, while the current drain imposed on the receiver coil by the indicating means is kept low.

In Fig. 2 is shown another possible multiple coil arrangement supported on a single core 35, which may be made of magnetic or nonmagnetic material as desired. One coil 36 may be wound on the external surface of the core 35, or in helical grooves in said core. A second coil 37 may be embedded in the core 35 beneath the coil 36, the coefficient of coupling between the coils 36 and 37 again being substantially unity. The ends of the coils 36 and 37 may be connected to the conductors 38, 39 and 41, 39, respectively, for coupling the coils to the electronic equipment in the housing 16 shown in Fig. 1.

A third embodiment of the invention is shown in Fig. 3 wherein a cylindrical core 42 of magnetic material is helically wound with an insulated conductor 43. An intermediate turn of the winding formed by the conductor 43 is tapped by a conductor 44 to form two axially spaced coils 45 and 46 having a coefficient of coupling of substantially unity. One coil may be used for transmitting or establishing the induction field and the other may be used for receiving or responding to the field. The conductors 47, 44 and 48, 44 connect the coils 45 and 46, respectively, to the electronic equipment in the housing 16 shown in Fig. 1.

Of course, it will be understood by those skilled in the art that the multiple coil systems disclosed in connection with Figs. 1 through 3 are preferably centered in the bore hole 12 to minimize the effect of any drilling liquid 14 and are provided with electrostatic shielding to eliminate any appreciable capacitive coupling with the wall of the bore hole.

Since other arrangements of a transmitting coil and a receiving coil in closely inductively coupled relation on a single core will readily occur to those skilled in the art after studying the above disclosure, it is to be understood that the illustrated embodiments are merely representative and the invention is limited only by the appended claims.

I claim:

1. In apparatus for investigating earth formations traversed by a bore hole, the combination of an elongated core adapted to be lowered into the bore hole, first and second coils supported by said core in close inductive coupling relation, means for energizing one of said coils with alternating current of substantially constant magnitude, and means responsive to the signal induced in the other of said coils for indicating a characteristic of the earth formations.

2. In apparatus for investigating earth formations traversed by a bore hole, the combination of an elongated core adapted to be lowered into the bore hole, first and second coils supported on said core in coaxial relationship to each other, the coefficient of coupling between said coils being substantially unity, means for energizing one of said coils with alternating current of substantially constant magnitude, and means responsive to the signal induced in the other of said coils for indicating a characteristic of the earth formations.

3. In apparatus for investigating earth formations traversed by a bore hole, the combination of an elongated magnetically permeable core adapted to be lowered into the bore hole, first and second coils supported by said core in mutually inductive relationship, the coefficient of coupling between said coils being substantially unity, means for energizing one of said coils with alternating current of substantially constant magnitude, and low current drain means responsive to the signal induced in the other of said coils for indicating a characteristic of the earth formations.

4. In apparatus for investigating earth formations traversed by a bore hole, the combination of an elongated cylindrical magnetically permeable core adapted to be lowered into the bore hole, first and second helical coils supported by said core in substantially coaxial relationship thereto, the coefficient of coupling between said coils being substantially unity, means for energizing one of said coils with alternating current of substantially constant magnitude, and means responsive to the signal induced in the other of said coils for indicating a characteristic of the earth formations.

5. In apparatus for investigating earth formations traversed by a bore hole, the combination of an elongated cylindrical core adapted to be lowered into the bore hole, first and second helical coils of substantially the same longitudinal extent supported by said core, the coefficient of coupling between said coils being substantially unity, means for energizing one of said coils with alternating current of substantially constant magnitude, and means responsive to the signal induced in the other of said coils for indicating a characteristic of the earth formations.

6. In apparatus for investigating earth formations traversed by a bore hole, the combination of an elongated cylindrical core adapted to be lowered into the bore hole, a first coil helically wound on said core, a second coil helically wound on said core between the turns of said first coil, the coefficient of coupling between said first and second coils being substantially unity, means for energizing one of said coils with alternating current of substantially constant magnitude, and means responsive to the signal induced in the other of said coils for indicating a characteristic of the earth formations.

7. In apparatus for investigating earth formations traversed by a bore hole, the combination of an elongated cylindrical core adapted to be lowered into the bore hole, a first conductor helically wound on said core, a second conductor connected to an intermediate turn of said first conductor to form a first coil between one end of said first conductor and said second conductor and a second coil between the other end of said first conductor and said second conductor, the coefficient of coupling between said first and second coils being substantially unity, means for energizing one of said coils with alternating current of substantially constant magnitude, and means responsive to the signal induced in the other of said coils for indicating a characteristic of the earth formations.

8. In induction well logging apparatus, the combination of an elongated magnetically permeable core, a multiple turn coil wound on said core, a conductor for connecting with an intermediate point on said coil, means for energizing one end of said coil with alternating current of substantially constant magnitude, and means for responding to the voltage induced in the other end of said coil for producing a well logging signal, the coefficient of coupling between the two ends of said coil being substantially unity.

9. In induction well logging apparatus, the combination of a cylindrical core, a multiple turn coil helically wound on said core, a conductor for connecting substantially with the midpoint of said coil, means for energizing one-half of said coil with alternating current of substantially constant magnitude, and means for responding to the voltage induced in the other half of said coil for producing a well logging signal, the coefficient of coupling between the two halves of said coil being substantially unity.

10. In apparatus for investigating earth formations traversed by a bore hole, the combination of an elongated cylindrical core adapted to be lowered into the bore hole, a first coil helically wound on said core, a second coil helically wound on said core beneath said first coil, means for energizing one of said coils with alternating current of substantially constant magnitude, and low current drain means responsive to the signal induced in the other of said coils for indicating a characteristic of the earth formations.

References Cited in the file of this patent

UNITED STATES PATENTS

| | | |
|---|---|---|
| 380,943 | Shallenberger | Apr. 10, 1888 |
| 2,321,355 | Berman | June 8, 1943 |
| 2,582,314 | Doll | Jan. 15, 1952 |